United States Patent [19]
Mandley

[11] 3,788,654
[45] Jan. 29, 1974

[54] MULTIPLE HARDNESS O-RINGS
[75] Inventor: Donald J. Mandley, Washington, Mich.
[73] Assignee: General Motors Corporation, Detroit, Mich.
[22] Filed: Sept. 30, 1971
[21] Appl. No.: 185,287

[52] U.S. Cl............ 277/229, 277/228, 285/DIG. 19
[51] Int. Cl................................................. F16j 9/00
[58] Field of Search... 277/227, 228, 229, 207, 226; 285/DIG. 1; 264/347, 236

[56] References Cited
UNITED STATES PATENTS
2,360,734  10/1944  Smith................................. 277/229
R24,478  5/1958  Kilbourne........................... 277/228

Primary Examiner—William T. Dixson, Jr.
Assistant Examiner—Robert L. Smith
Attorney, Agent, or Firm—Peter D. Sachtjen

[57] ABSTRACT

A multiple hardness O-ring wherein a molded ring of nitrile rubber including partially unactivated materials has a hardened skin formed by surface curing the unactivated materials in a solution of the curing agent for nitrile rubber thereby providing secondary curing period which increases the exterior hardness and improves the compression set characteristics of the O-ring.

2 Claims, 4 Drawing Figures

PATENTED JAN 29 1974 3,788,654

INVENTOR.
Donald J. Mandley
BY
Peter D. Sachtjen
ATTORNEY

MULTIPLE HARDNESS O-RINGS

The present invention relates to elastomeric articles, and, in particular, to molded fluid sealing elements having multiple hardness cross-sections which provide increased extrusion and abrasion resistance and improved compression set characteristics.

Fluid seals of the type used in high pressure sealing installations must possess characteristics which ensure extended life under varying pressure and operating conditions. Preferably, a seal of this type should be formed of a compound which resists extrusion and surface abrasion under high pressure while maintaining low compression set characteristics such that the element continuously conforms to the mating surface under dynamic and static operating conditions. In satisfying the above criteria, two basic sealing techniques have evolved. The standard practice is to select an elastomeric compound which has a high hardness and modulus of elasticity for providing the necessary extrusion and abrasion resistance and, at the same time, has a high resiliency for providing a desirable low compression set. However, inasmuch as the compression set increases with an increasing modulus and hardness, the task of providing a sealing element in accordance with the above has not been successful. The second method has been to select two separate sealing elements for providing the mutually incompatible properties. The first sealing element has a low modulus of elasticity for providing the desired compression set property and is used as a primary sealing barrier. The second element has a higher modulus and functions as a backup ring to prevent extrusion of the first element. This approach, however, also has disadvantages. The backup ring as an extra component raises the product and installation cost. The softer first element exhibits lower abrasion resistance and a higher dynamic friction thereby decreasing the service life of the assembly.

The present invention provides all of the above characteristics in a single sealing element by converting the exterior surface of the sealing element to an increased hardness. Generally, this is accomplished by taking advantage of the unactivated ingredients inherent in the molded elastomeric material. By exposing the molded article to a solution of its own curing agent for a secondary curing period, the unactivated ingredients in the outer surface are converted to a higher hardness that yields improved extrusion and abrasion resistance while maintaining the low compression set of softer interior core. Although the process is particularly well adapted for nitrile rubber compounds, other compounds such as silicone, styrene-butadiene, and polyurethane also should experience a surface hardening during the secondary curing period.

The above and other features of the present invention will be apparent to one skilled in the art upon reading the following detailed description, reference being made to the accompanying drawings illustrating a preferred embodiment of the present invention in which.

Figure 1:
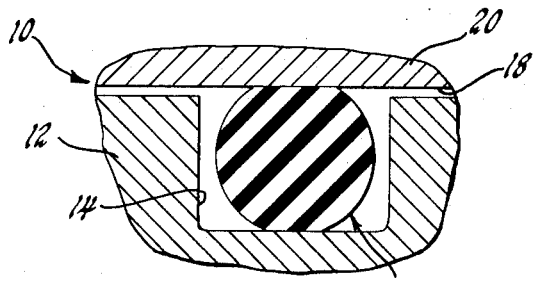
FIG. 1 is a cross sectional view of an unpressurized O-ring sealing installation.

Referring to FIG. 1, there is shown a sealing installation 10 comprising a piston 12 having a radially outwardly opening groove 14 which retains an annular sealing element or O-ring 16. The piston 12 reciprocates or rotates with respect to the mating surface 18 of a cylindrical bore in a housing 20. The sealing element 16 as hereinafter described maintains a static and dynamic sealing contact between the surface 18 and the piston 12 under varying pressure and operating conditions. While the present invention is described with reference to O-rings, it will be clearly appreciated that this improved construction and method of manufacture may also be beneficially incorporated into other sealing environments requiring improved extrusion, abrasion, and compression set characteristics.

Figure 2:
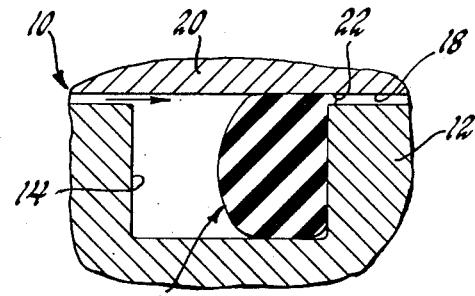
FIG. 2 is a view similar to FIG. 1 showing the O-ring under pressurized conditions.

As shown in FIG. 2, the sealing installation 10 is exposed to fluid pressure on the left side of the groove 14 and deforms in the direction of the fluid pressure such that an annular ring 22 partially extrudes between the surface 18 and the piston 12. This extrusion increases the surface contact and frictional resistance to relative movement at the surface 18 and, at the same time, additionally compresses the sealing element. This compression and extrusion has two effects. First, the extrusion increases the frictional wear. Second, the compression of the article causes a compression set which decreases the ability of the article to conform to the mating surface and provide positive sealing under all pressure conditions. For the conventional compounds used in O-rings, the compression set increases with the increasing hardness. Therefore, achieving satisfactory sealing requires the balancing of two mutually incompatible characteristics.

Generally, such elements comprise a molded elastic component such as nitrile rubber which is blended and cured in a conventional manner. After molding, the cured article has a substantially uniform modulus of elasticity and includes substantially evenly dispersed unactivated ingredients. For instance, the unactivated ingredients may comprise a base polymer and activator. As previously mentioned, such an article will have a compression set which increases with increasing hardness of the molded article.

Figure 3:
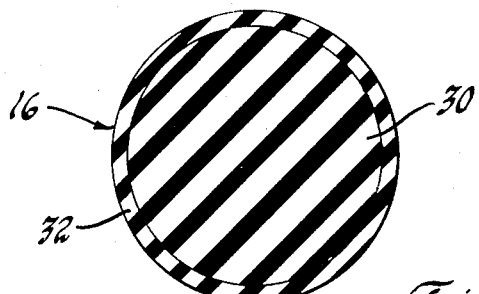
FIG. 3 is an enlarged cross sectional view of the O-ring showing the hardened skin and resilient core.

Referring to FIG. 3, the sealing ring 16 of the present invention has a circular cross section consisting of an inner core 30 and a hardened exterior skin 32. The inner core 30 is selected to provide the desired compression set and the outer skin is hardened as hereinafter explained to provide improved abrasion and extrusion resistance.

More particularly, the skin 32 is converted to a higher hardness by taking advantage of the aforementioned unactivated ingredients in molded product. This treatment is accomplished by exposing the finished molded article to a solution of its own curing agent for a secondary curing period. The depth of penetration and thus the depth of hardening during such treatment is dependent upon the type of elastomeric compound, the concentration of the curing agent, and the time and temperature of the secondary curing period.

Figure 4:
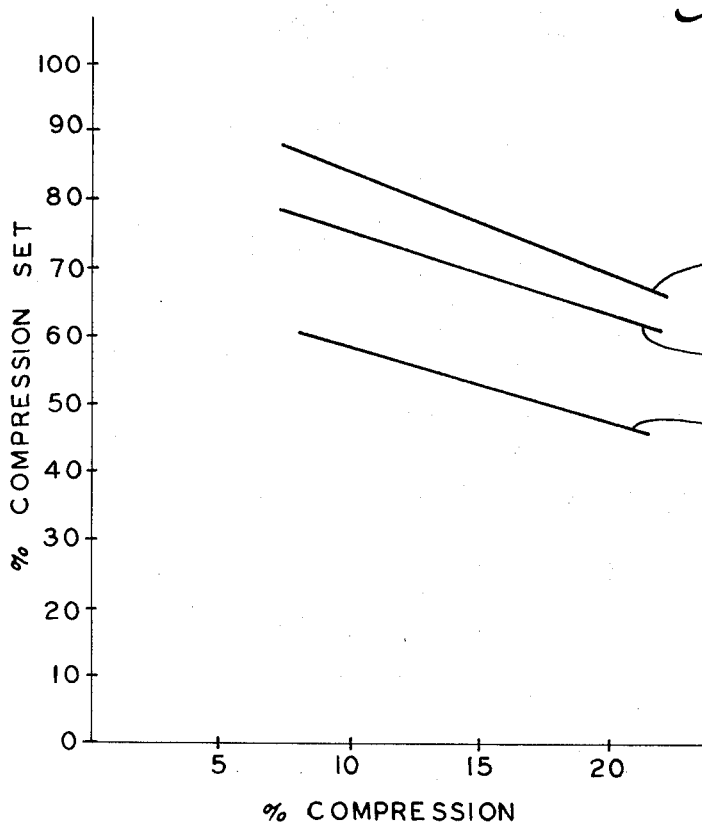
FIG. 4 is a graph showing the relationship between percent compression versus percent compression set for conventional O-rings and for multiple hardness O-rings made in accordance with the present invention.

FIG. 4 shows the relation between percent compression and percent compression set for three molded articles; a sealing element 40 having a 90 IRHD hardness, a sealing element 42 having a uniform 80 IRHD hardness, and a multiple hardness element 44 made in accordance with the present invention. For reference purposes, the compression set is determined by reference to the molded cross section of the sealing element. The percent compression set is the percentage the compressed sealing element returns to its original dimensions. The sealing elements 40 and 42 were the same in composition, the sealing element 44 being modified only sufficiently to achieve the 10 point increase in hardness. The above results reflect a 200 hour compression period on a sealing element having 1.00 inner diameter and 0.139 square inch circular cross sectional area.

The sealing element, based on parts by weight, used a base polymer comprising 100 parts butadiene-acrylo nitrile copolymer rubber, a softener of one part stearic acid, a reinforcer of 38 parts carbon black, seven parts of a monomer resin, an accelerator-activator of five parts zinc oxide, five parts of a zinc-based anti-oxidant, and a curing agent of five parts of di-cumyl peroxide having 40 percent free peroxide. This element was subjected to a secondary period in a solution of di-cumyl peroxide having 98 percent free peroxide for 30 minutes at 400°F. The element had an initial molded hardness of 80 IRHD and, after the secondary curing, a skin hardness of 88 IRHD with the skin having a depth of 0.012 inch.

It will be noted that the 90 IRHD element 40 had a substantially higher compression set at each compression level. Likewise, it will be noted that the 80 IRHD element 42 had a slightly lower compression set at each compression level. This reflects a conventional result and indicates that the percent compression set increases with hardness. However, it will be noted that the characteristics of the multiple hardness element 44 are not predictable or explainable by comparison with the other samples. Inasmuch as the articles comprise a 90 IRHD skin and an 80 IRHD core, it might be expected that the percent compression set characteristics would range between the limits defined between element 40 and 42. However, the multiple hardness element 44 provides a considerably reduced percent compression set than either of the other elements. For instance, at a 10 percent compression, the multiple hardness element 44 has a compression set of about 16 points or 21 percent below element 42 and about 24 points or 29 percent below element 40. At a 20 percent compression, the multiple hardness element 44 represented a 22 point or 32 percent improvement over element 40 and a 15 point or 25 percent improvement over element 42.

A second sealing element composition having improved compression set characteristics comprised 100 parts butadiene-acrylo nitrile copolymer rubber, one part stearic acid, 25 parts carbon black, five parts zinc oxide, five parts zinc-based anti-oxidant, and five parts di-cumyl peroxide having 40 percent free peroxide. This compound was exposed to a second curing period in a solution of di-cumyl peroxide having 98 percent free peroxide for 30 minutes under 400°F. From an initial hardness of 65 IRHD, the final element had a skin hardness of 72 IRHD with a depth of penetration of 0.012 inch.

A further compound exhibiting the improved characteristics outlined above comprised 100 parts butadiene-acrylo nitrile copolymer, one part stearic acid, 20 parts carbon black, five parts zinc oxide, five parts zinc-based anti-oxidant, and five parts di-cumyl peroxide having 40 percent available peroxide. This compound was exposed to a secondary curing period in a solution of di-cumyl peroxide having 98 percent free peroxide for 30 minutes at 400°F. starting with an initial hardness 60 IRHD. The hardened product had a skin 68 IRHD with a hardness and a depth of 0.012 inch.

The subject nitrile rubber specimens, are generally preferred because they are easily molded in open atmosphere. However, it is felt in any elastomeric material having unactivated ingredients can be surface hardened as outlined above by exposing the finished molded article to secondary cure in a solution of its own curing agent. Also, the final hardness would be in excess to original hardness and would provide increased extrusion and abrasion resistance while maintaining and improving the compression set of the original article.

Inasmuch as other forms of this invention will be readily apparent to those skilled in the art, it is not intended to limit the scope of this invention by those embodiments selected for the purpose of this disclosure but only by the claims which follow.

What is claimed is:

1. A one piece molded sealing ring comprising: an annular member formed of a nitrile compound and including partially unactivated materials, said member having a hardened skin section of substantially reduced unactivated materials formed by exposing the exterior surface of said member to a solution of the curing agent for said nitrile compound.

2. A multiple hardness O-ring comprising: a one piece annular element molded from a nitrile rubber and having a circular cross-section, said element including a resilient inner core having partially unactivated materials and a hardened exterior skin surface having substantially reduced unactivated materials, said hardened skin being formed by exposing the exterior of said element to a solution of the curing agent for said nitrile rubber thereby providing a finished element having an exterior of increased hardness and abrasion resistance while maintaining a resilient inner core.

* * * * *